United States Patent
Kocan

(10) Patent No.: US 8,555,220 B2
(45) Date of Patent: Oct. 8, 2013

(54) TIMING VERIFICATION METHOD FOR DETERMINISTIC AND STOCHASTIC NETWORKS AND CIRCUITS

(75) Inventor: Fatih Kocan, Istanbul (TR)

(73) Assignee: Umm Al-Qura University, Makkah (SA)

( * ) Notice: Subject to any disclaimer, the term of this patent is extended or adjusted under 35 U.S.C. 154(b) by 0 days.

(21) Appl. No.: 13/408,988

(22) Filed: Feb. 29, 2012

(65) Prior Publication Data

US 2013/0227506 A1 Aug. 29, 2013

(51) Int. Cl.
  *G06F 9/455* (2006.01)
  *G06F 17/50* (2006.01)

(52) U.S. Cl.
  USPC .......................................... 716/108; 716/113

(58) Field of Classification Search
  USPC .................................. 716/108, 113
  See application file for complete search history.

(56) References Cited

U.S. PATENT DOCUMENTS

| | | | | |
|---|---|---|---|---|
| 6,745,374 | B2 * | 6/2004 | Tekumalla et al. | 703/16 |
| 7,802,209 | B2 | 9/2010 | Liu et al. | |
| 7,818,700 | B2 * | 10/2010 | Muller-Brahms | 716/123 |
| 7,934,182 | B2 | 4/2011 | Nitta et al. | |
| 2007/0113211 | A1 * | 5/2007 | Zhang et al. | 716/6 |
| 2011/0125480 | A1 | 5/2011 | Homma | |
| 2012/0324414 | A1 * | 12/2012 | Tzoref-Brill et al. | 716/136 |

OTHER PUBLICATIONS

Parodi et al.; "A non-enumerative path delay fault simulator for sequential circuits"; Oct. 1998; International Test Conference; pp. 934-943.*
Padmanaban et al.; "A Critical Path Selection Method for Delay Testing"; Oct. 2004; ITC International Test Conference; pp. 232-241.*
Somashekar et al.; "Non-Enumerative Generation of Statistical Path Delays for ATPG"; Oct. 2012; ECE Department, Southern Illinois University; pp. 514-515.*
Christou et al.; "Identification of critical primitive path delay faults without any path enumeration"; Apr. 2010; VLSI Test Symposium; pp. 9-14.*
Reconfigurable randomized K-way graph partitioning F Kocan—Proceedings of the 2003 ACM/SIGDA eleventh . . . , 2003—portal.acm.org.
Static variable ordering in zbddz for path delay fault coverage calculation [PDF] from psu.eduF Kocan, M Gunes . . . - . . . Midwest Symposium on, 2004—ieeexplore.ieee.org.
On the zbdd-based noenumerative path delay fault coverage calculation [PDF] from psu.eduF Kocan . . . - . . . and Systems, IEEE Transactions on, 2005—ieeexplore.ieee.org.

* cited by examiner

*Primary Examiner* — Suresh Memula
(74) *Attorney, Agent, or Firm* — Richard C Litman

(57) ABSTRACT

The timing verification method for deterministic and stochastic networks and circuits is a computerized method that includes a non-enumerative path length analysis algorithm for deterministic and stochastic directed acyclic graphs (DAGs) with applications to timing verification of circuits, the algorithm computing statistical measures of path lengths without storing and/or manipulating the paths in such networks. The timing verification method is able to compute deterministic or probabilistic costs assigned to edges, vertices, or both.

12 Claims, 26 Drawing Sheets

```
Algorithm 1 TopK(K, L)
Require: 0 < K ≤ |L|
  min ← L.MinVal()
  max ← L.MaxVal()
  mid_prev ← 0
  while !done do
    mid_prev ← mid
    mid ← (min + max)/2
    if mid == mid_prev then
      mid ← mid + 1
    end if
    count1 ← (L.TermsEQ(mid)).CountTerms()
    count2 ← (L.TermsGT(mid)).CountTerms()
    if (count1 + count2) < K then
      max ← mid
    else if count2 ≥ K then
      min ← mid
    else
      done ← 1
    end if
  end while
  return L.TermsGE(mid)
```

Algorithm 1 $TopK(K, \mathcal{L})$
Require: $0 < K \leq |\mathcal{L}|$
  $min \leftarrow \mathcal{L}.MinVal()$
  $max \leftarrow \mathcal{L}.MaxVal()$
  $mid\_prev \leftarrow 0$
  while !done do
    $mid\_prev \leftarrow mid$
    $mid \leftarrow (min + max)/2$
    if $mid == mid\_prev$ then
      $mid \leftarrow mid + 1$
    end if
    $count1 \leftarrow (\mathcal{L}.TermsEQ(mid)).CountTerms()$
    $count2 \leftarrow (\mathcal{L}.TermsGT(mid)).CountTerms()$
    if $(count1 + count2) < K$) then
      $max \leftarrow mid$
    else if $count2 \geq K$ then
      $min \leftarrow mid$
    else
      $done \leftarrow 1$
    end if
  end while
  return $\mathcal{L}.TermsGE(mid)$

*Fig. 1*

Algorithm 2 Paths and their delays: PathDelays()
Require: $V[1..N]$ : Topologically sorted vertices
  for $i \leftarrow 1; i \leq N; i \leftarrow i + 1$ do
    $\mathcal{L}i \leftarrow 0$
    for each incidence vertex $vj$ of $vi$ do
      $\mathcal{L}i \leftarrow \mathcal{L}i + \mathcal{L}j$
    end for
    if $\mathcal{L}i$ is 0 then
      $\mathcal{L}i \leftarrow Cost(vi) \cdot vi$
    else
      $\mathcal{L}i \leftarrow (\mathcal{L}i + Cost(vi) \cdot (\mathcal{L}i == \mathcal{L}i)) \cdot vi$
    end if
  end for
  $\mathcal{L} \leftarrow 0$
  for each sink $vi$ do
    $\mathcal{L} \leftarrow \mathcal{L} + \mathcal{L}i$
  end for
  $longest \leftarrow \mathcal{L}.MaxVal()$
  return $TopK(K, \mathcal{L})$

*Fig. 2*

Algorithm 3 Partition-level path delay analysis
$\mathcal{L}p \leftarrow$ PathDelays() in Algo. 2 for each partition $p$
for every cut sequence $\tau = vi \cdot vi+1 \cdot vi+2 \cdots vm$ do
    $\mathcal{L}\tau \leftarrow 1$
    for $j \leftarrow i; j < m; j \leftarrow j + 1$ do
        $p$ is a subgraph where $vj(vj+1) \in$ Source (Sink) of $p$
        $\mathcal{L}\tau \leftarrow \mathcal{L}\tau \times ((\mathcal{L}p).Restrict(vj)).Restrict(vj+1)$
    end for
    $\mathcal{L} \leftarrow TopK(K, \mathcal{L} + \mathcal{L}\tau)$
end for
return $\mathcal{L}$

*Fig. 3*

Algorithm 4 Variance and expected values of path delays

Require: $n$: the distance from the mean
$\mathcal{R} \leftarrow V\,SOP\,(Graph\,G)$
$\mathcal{V} \leftarrow 0$
$\mathcal{E} \leftarrow 0$
for $i \leftarrow 1; i \leq |V|; i++$ do
   $\mathcal{E} \leftarrow \mathcal{E} + \{R.Restrict(vi)\} * E[vi]$
   $\mathcal{V} \leftarrow \mathcal{V} + \{R.Restrict(vi)\} * Cov[vi, vi]$
   for $j \leftarrow i+1; j \leq |V|; j++$ do
     $\mathcal{V} \leftarrow \mathcal{V} + \{R.Restrict(vi * vj)\} * 2 * Cov[vi, vj]$
   end for
end for
$\sigma \leftarrow ApproxSTD(\mathcal{V})$
return $topK(\mathcal{E} + n \times \sigma)$

*Fig. 4*

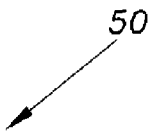

---
Algorithm 5 Approx. standard deviations: ApproxSTD($\mathcal{V}$)
---
$max\_\sigma \leftarrow \mathcal{V}.MaxV$
$min\_\sigma \leftarrow \mathcal{V}.MaxVal()$
$\sigma \leftarrow 0$
for $i \leftarrow min\_\sigma; i = 0 \wedge i \leq max\_\sigma;$ do
    $l \leftarrow (\mathcal{V}.TermsGE(i2)).TermsLT((i+1)2)$
    $\sigma \leftarrow \sigma i * (l == l)$
    $i \leftarrow (\mathcal{V}.TermsGT(i2)).MinVal()$
end for
---

*Fig. 5*

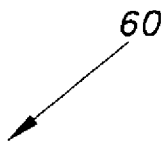

---
Algorithm 6 Partition-level stochastic path delay analysis
---
for every cut sequence $\tau = v_i \cdot v_{i+1} \cdot v_{i+2} \cdots v_m$ do

Compute $\mathcal{E}\tau$

Compute $\mathcal{V}\tau$ $\sigma\tau \leftarrow ApproxSTD(\mathcal{V})$ $\mathcal{L}\tau \leftarrow \mathcal{E} + n \times \sigma\tau$ $\mathcal{L} \leftarrow TopK(K, \mathcal{L} + \mathcal{L}\tau)$ end for return $\mathcal{L}$

---
Algorithm 7 Basic coverage calculation (*CoCa+*)
---
Require: $\mathcal{LB}$: Lower bound
  $C \leftarrow 0$
  for $i \leftarrow 1; i \leq VectorCount; i \leftarrow i + 1$ do
    $Gi \leftarrow Simulate()$
    $Ci \leftarrow \textbf{PathDelays}(Gi)$
    $C \leftarrow C + Ci - C.Permit(Ci)$
    $C \leftarrow C.TermsGE(\mathcal{LB})$
  end for
  return $|C|$
---

Algorithm 8 *SequenceCoverage+($\tau$, vi)*

Require: $\tau$: an activated complete cut node sequence
$C\tau \leftarrow$ PathDelays($G_{vj}, \tau$)
$C\tau \leftarrow C\tau.TermsGE(LB)$
for each vector $vj \in V\tau$ do
   $G_{vj} \leftarrow Resimulate(vj)$
   $P_{vj,\tau} \leftarrow$ PathDelays($G_{vj}, \tau$)
   $P_{vj,\tau} \leftarrow P_{vj,\tau}.TermsGE(\mathcal{LB})$
   $C\tau \leftarrow C\tau - P_{vj,\tau}$
end for
return $|C\tau|$

*Fig. 8*

TABLE I
ENCODING VALUES OF $F$'S TERMS

| $F$ | Value | $F2$ | $F1$ | $F0$ |
|---|---|---|---|---|
| $abc$ | 4(100) | 1 | 0 | 0 |
| $ab$ | 5(101) | 1 | 0 | 1 |
| $bc$ | 3(111) | 1 | 1 | 1 |
| $a$ | 1(001) | 0 | 0 | 1 |

*Fig. 9*

VSOP EXAMPLES                              1100

| Operation | Result |
|---|---|
| $F.Restrict(a)$ | $4abc + 5ab + a$ |
| $F.Restrict(ab)$ | $4abc + 5ab$ |
| $F.Restrict(a + b)$ | $4abc + 5ab + 3bc + a$ |
| $F.Permit(ab)$ | $5ab + a$ |
| $F.Permit(abc)$ | $4abc + 5ab + 3bc + a$ |
| $F.Permit(c)$ | $0$ |
| $F.CountTerms()$ | $4$ |
| $F.MaxVal()$ | $5$ |
| $F.MinVal()$ | $1$ |
| $F.TermsGE(3)$ | $4abc + 5ab + 3bc$ |
| $F.TermsLT(3)$ | $a$ |
| $F + G$ | $4abc + 10ab + a$ |
| $F - G$ | $4abc + 6bc + a$ |
| $F \times G$ | $5abc + 30ab - 9bc$ |
| $F == G$ | $ab$ |
| $F > G$ | $abc + bc + a$ |
| $G > F$ | $0$ |
| $F != G$ | $abc + bc + a$ |

*Fig. 11*

Statistical SUM operation

Statistical SUMMAX operation

Delay fault illustration

SUM OF POWERS OF PATH LENGTHS

| $Svi(k)$ | $vs$ | $v6$ | $v7$ | $v8$ | $v9$ | $v10$ | $v11$ |
|---|---|---|---|---|---|---|---|
| 0 | 1 | 2 | 2 | 3 | 3 | 5 | 6 |
| 1 | 0 | 5 | 8 | 16 | 18 | 34 | 43 |
| 2 | 0 | 13 | 32 | 88 | 114 | 252 | 317 |
| 3 | 0 | 35 | 128 | 496 | 750 | 1990 | 2389 |
| 4 | 0 | 97 | 512 | 2848 | 5058 | 16404 | 18305 |

| Bench | I/O | Vertex | Edge | Path Count |
|---|---|---|---|---|
| c880 | 60/26 | 443 | 729 | 8,642 |
| c1355 | 41/32 | 587 | 1064 | 4,173,220 |
| c1908 | 33/25 | 913 | 1498 | 729,057 |
| c2670 | 233/140 | 1426 | 2076 | 679,960 |
| c3540 | 50/22 | 1719 | 2939 | 28,676,700 |
| c5315 | 178/123 | 2485 | 4386 | 1,341,300 |
| c6288 | 32/32 | 2448 | 4800 | $9.89434 \times 10^{19}$ |
| c7552 | 207/108 | 3719 | 6144 | 726,494 |
| cs1423 | 91/79 | 748 | 1164 | 44,726 |
| cs9234 | 247/250 | 5844 | 7971 | 244,854 |
| cs13207 | 700/790 | 8679 | 11193 | 1,345,370 |
| cs15850 | 611/684 | 10386 | 13648 | 164,738,000 |
| cs38417 | 1664/1742 | 23921 | 32106 | 1,391,580 |
| cs38584 | 1464/1730 | 20869 | 32908 | 1,080,720 |
| b18 | 3358/3343 | 68720 | 144218 | $2.56169 \times 10^{21}$ |
| b20 | 522/512 | 9402 | 19047 | $7.67318 \times 10^{14}$ |
| b22 | 779/757 | 5058 | 30525 | $2.25219 \times 10^{11}$ |

Fig. 20

| cost = 1 | $\mu$ | $\sigma$ | $\gamma_1$ | $\gamma_2$ | $L_p$ | $\mu\sigma_2$ | Time |
|---|---|---|---|---|---|---|---|
| c880 | 17.93 | 3.85 | -0.62 | 0.53 | 25 | 336.40 | 0.015 |
| c1355 | 21.80 | 2.13 | -1.61 | 1.78 | 25 | 479.94 | 0.070 |
| c1908 | 29.71 | 14.68 | -0.96 | 1.47 | 41 | 905.20 | 0.098 |
| c2670 | 25.59 | 3.15 | -0.98 | 2.47 | 33 | 665.26 | 0.153 |
| c3540 | 34.40 | 4.39 | -0.74 | 0.91 | 48 | 1202.77 | 0.227 |
| c5315 | 35.42 | 6.16 | -1.33 | 2.86 | 50 | 1293.00 | 0.441 |
| c6288 | 91.60 | 9.17 | 0.07 | -0.58 | 125 | 8475.51 | 0.386 |
| c7552 | 29.21 | 7.11 | -0.89 | -0.09 | 44 | 904.078 | 0.828 |
| cs1423 | 33.27 | 11.83 | -0.42 | -0.60 | 60 | 1247.48 | 0.037 |
| cs9234 | 38.40 | 10.45 | 0.00 | -0.22 | 59 | 1584.48 | 1.94 |
| cs13207 | 44.03 | 6.21 | -0.44 | 2.55 | 60 | 1977.84 | 5.20 |
| cs15850 | 69.01 | 6.68 | -2.15 | 5.83 | 83 | 4807.71 | 11.575 |
| cs38417 | 28.14 | 4.04 | -1.26 | 2.60 | 48 | 808.69 | 1:43 |
| cs38584 | 39.07 | 9.15 | -1.42 | 2.55 | 57 | 1611.08 | 1:25 |
| b20 | 115.98 | 10.32 | -0.31 | 0.25 | 166 | 13559.17 | 15.78 |
| b22 | 88.66 | 19.38 | -0.12 | -0.14 | 154 | 8237.51 | 59.90 |

|  | Time |  | Time |
|---|---|---|---|
| c880 | 0.054 | cs1423 | 0.109 |
| c1355 | 0.062 | cs9234 | 1.759 |
| c1908 | 0.080 | cs13207 | 4.669 |
| c2670 | 0.148 | cs15850 | 7.946 |
| c3540 | 0.245 | cs38417 | 89.468 |
| c5315 | 0.422 | cs38584 | 75.476 |
| c6288 | 0.454 | b20 | 10.041 |
| c7552 | 0.839 | b22 | 41.723 |

BASIC DETERMINISTIC PATH DELAY RESULTS

| Bench | Node | Time |
|---|---|---|
| c880 | 131,369 | 0.4 |
| c1355 | 2,734,399 | 12.0 |
| c1908 | 1,770,642 | 5.5 |
| c2670 | 694,864 | 2.5 |
| c3540 | 7,475,667 | 35.0 |
| c5315 | 1,760,290 | 6.3 |
| c7552 | 2,695,906 | 9.4 |
| cs1423 | 437,409 | 1.2 |
| cs9234 | 3,312,306 | 10.8 |
| cs13207 | 4,863,122 | 20.6 |
| cs15850 | 32,532,721 | 145.0 |
| cs38417 | 17,394,136 | 73.1 |
| cs38584 | 4,869,704 | 28.1 |

*Fig. 23*

PARTITION-BASED DETERMINISTIC PATH DELAY RESULTS

| Bench | p=1 Node | Time | p=2 Node | Time | p=3 Node | Time |
|---|---|---|---|---|---|---|
| c880 | 19,877 | 1 | 5,978 | 2 | 4,122 | 3 |
| c1355 | 121,083 | 20 | 27,484 | 35 | 42,137 | 69 |
| c1908 | 121,273 | 17 | 27,894 | 18 | 11,177 | 61 |
| c2670 | 68,636 | 13 | 35,984 | 27 | 14,556 | 18 |
| c3540 | 335,227 | 168 | 70,649 | 300 | 39,756 | 253 |
| c5315 | 120,910 | 35 | 62,906 | 60 | 29,185 | 80 |
| c7552 | 283,331 | 36 | 79,709 | 88 | 48,708 | 121 |
| cs1423 | 50,702 | 9 | 17,722 | 11 | 12,647 | 10 |
| cs9234 | 422,724 | 38 | 138,437 | 77 | 77,061 | 55 |
| cs13207 | 459,224 | 106 | 195,826 | 122 | 95,341 | 121 |
| cs15850 | 1,759,471 | 1460 | 553,770 | 1937 | 277,106 | 219:37 |
| cs38417 | 2,010,553 | 34:37 | 413,366 | 69:6 | 227,040 | 102:57 |
| cs38584 | 938,420 | 11:80 | 476,707 | 26:80 | 218,092 | 47:38 |

*Fig. 24*

BASIC STOCHASTIC PATH DELAY RESULTS

| Bench | Node | Time(m:s) |
|---|---|---|
| c880 | 282,230 | 00:20 |
| c1355 | 26,155,732 | 43:12 |
| c1908 | 12,276,888 | 25:09 |
| c2670 | 4,682,496 | 11:35 |
| c5315 | 17,936,960 | 58:53 |
| c7552 | 13,426,840 | 29:39 |
| cs1423 | 953,633 | 1:39 |
| cs9234 | 13,201,892 | 30:53 |
| cs13207 | 37,802,366 | 148:54 |
| cs38417 | 47,903,589 | 239:52 |
| cs38584 | 24,044,737 | 136:44 |

*Fig. 25*

|  | Part | Node | Time(m:s) |
|---|---|---|---|
| c880 | 3 | 4,429 | 12:00 |
| c1355 | 3 | 49,315 | 31:31 |
| c1908 | 3 | 13,518 | 20:57 |
| c2670 | 3 | 20,216 | 4:16 |
| c3540 | 3 | 58,128 | 210:38 |
| c5315 | 3 | 30,051 | 9:55 |
| c6288 |  |  |  |
| c7552 | 3 | 126,026 | 8:14 |
| cs1423 | 3 | 12,846 | 1:54 |
| cs9234 | 3 | 91,114 | 8:11 |
| cs13207 | 3 | 93,390 | 15:17 |
| cs15850 | 6 | 128,340 | 398:28 |

TIMING VERIFICATION METHOD FOR DETERMINISTIC AND STOCHASTIC NETWORKS AND CIRCUITS

BACKGROUND OF THE INVENTION

1. Field of the Invention

The present invention relates to circuit design, and particularly to a timing verification method for deterministic and stochastic networks and circuits that provides a computerized method that includes a non-enumerative path length analysis algorithm for deterministic and stochastic directed acyclic graphs (DAGs) with applications to timing verification of circuits.

2. Description of the Related Art

A combinational logic circuit can be represented as a timing graph that describes the logic gates in the circuit with the directional connections between different gates. Program evaluation and review technique (PERT) is popularly used in static timing analysis, it is also known as the CPM (critical path method), which is the most widely used technique, used for delay calculations. CPM can be used to calculate the worst-case delay of a combinational circuit. Critical paths, required times and slacks are also a number of timing parameters for a combinational circuit that can also be calculated. Incremental timing analysis can be used to speed up the delay calculation. A negative aspect of the CPM is that of false paths, which results because the CPM completely ignores the Boolean relationships in a circuit, and works with purely topological properties. This renders the critical path delay found using CPM as pessimistic in the most general cases.

Thus, a timing verification method for deterministic and stochastic networks and circuits solving the aforementioned problems is desired.

SUMMARY OF THE INVENTION

The timing verification method for deterministic and stochastic networks and circuits is a computerized method that includes a non-enumerative path length analysis algorithm for deterministic and stochastic directed acyclic graphs (DAGs) with applications to timing verification of circuits, the algorithm computing statistical measures of path lengths without storing and/or manipulating the paths in such networks. The timing verification method is able to compute deterministic or probabilistic costs assigned to edges, vertices, or both.

These and other features of the present invention will become readily apparent upon further review of the following specification and drawings.

BRIEF DESCRIPTION OF THE DRAWINGS

FIG. 1 is a table providing the steps of a first algorithm of the timing verification method for deterministic and stochastic networks and circuits according to the present invention.

FIG. 2 is a table providing the steps of a second algorithm of the timing verification method for deterministic and stochastic networks and circuits according to the present invention.

FIG. 3 is a table providing the steps of a third algorithm of the timing verification method for deterministic and stochastic networks and circuits according to the present invention.

FIG. 4 is a table providing the steps of a fourth algorithm of the timing verification method for deterministic and stochastic networks and circuits according to the present invention.

FIG. 5 is a table providing the steps of a fifth algorithm of the timing verification method for deterministic and stochastic networks and circuits according to the present invention.

FIG. 6 is a table providing the steps of a sixth algorithm of the timing verification method for deterministic and stochastic networks and circuits according to the present invention.

FIG. 8 is a table providing the steps of an eighth algorithm of the timing verification method for deterministic and stochastic networks and circuits according to the present invention.

FIG. 9 is a table of F term's encoding of the timing verification method for deterministic and stochastic networks and circuits according to the present invention.

FIG. 11 is a table of VSOP operations of the timing verification method for deterministic and stochastic networks and circuits according to the present invention.

FIG. 20 is table of circuit descriptions in a timing verification method for deterministic and stochastic networks and circuits according to the present invention.

FIG. 23 is a table of basic deterministic path delay results in a timing verification method for deterministic and stochastic networks and circuits according to the present invention.

FIG. 24 is a table of partition-based deterministic path delay results in a timing verification method for deterministic and stochastic networks and circuits according to the present invention.

FIG. 25 is a table of basic stochastic path delay results in a timing verification method for deterministic and stochastic networks and circuits according to the present invention.

Similar reference characters denote corresponding features consistently throughout the attached drawings.

DETAILED DESCRIPTION OF THE PREFERRED EMBODIMENTS

Figure 7:
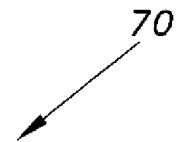
FIG. 7 is a table providing the steps of a seventh algorithm of the timing verification method for deterministic and stochastic networks and circuits according to the present invention.

The timing verification method for deterministic and stochastic networks and circuits includes a novel non-enumerative path length analysis algorithm for deterministic and stochastic directed acyclic graphs (DAGs) with applications to timing verification of circuits, the algorithm computing statistical measures of path lengths without storing and/or manipulating the paths in such networks. The inventive timing verification method is able to compute deterministic or probabilistic costs assigned to edges, vertices, or both.

Networks or graphs are fundamental modeling tools in mathematics and computing. They model many applications and enable us to map the problems of a modeled application to well-studied graph problems. Networks include nodes i.e., vertices, and edges. Often, costs are assigned to the nodes as well as edges. The costs may be deterministic, or stochastic, i.e., random variables. When costs are stochastic, networks are called stochastic networks, otherwise the networks are deterministic.

This disclosure introduces algorithms to find the top K most critical paths or some statistical measures of path lengths in stochastic/deterministic networks. Moreover, these inventive algorithms are applied to the timing verification and testing of digital circuits. More specifically, statistical parameters of path lengths are computed without operating on full paths. Additionally, all or selected paths along with their corresponding lengths are stored. In circuit timing analysis, lengths/costs are delays in circuits; therefore, path lengths are path delays. The inventive algorithms disclosed herein aim at addressing the problem of exponential growth in the number of paths. The inventive algorithms avoid path enumeration in their computations because path enumeration is infeasible. Paths that avoid enumeration are called non-enumerative paths.

With regard to the statistical parameters, calculations include the mean, variance, skewness, kurtosis, and, in general, $k^{th}$ central moment of the path lengths of deterministic network. For stochastic networks, calculations of the expected length and variance of paths are performed. In both network types, dependencies among the paths are taken into consideration. Using these calculated parameters and a few probability inequalities, some conclusions are drawn about the paths such as the number of paths within an interval relative to the mean. The inventive algorithm for computing some statistical measures of deterministic networks requires $O(k^2 \cdot (V+E))$ time and $O(k \cdot (V+E))$ memory space. For stochastic networks, the algorithm requires $O(k^2 \cdot (V+E))$ time to compute up to the $K^{th}$ moments of expected path lengths while $O((V+E)^2)$ time to compute the average variance of path lengths. The memory space requirement is the same as the deterministic network case. This algorithm does not store any full or even partial paths.

The second algorithm stores the paths along with their respective lengths and variances. This serves as a path database to length-involving queries. For example, the statistical parameters targeted by the first problem can also be calculated from this database. Additionally, the top K paths, the low K paths, the middle K paths, and, in general, the paths within a specified length interval may be queried. This approach can handle prohibitively large paths that makes it superior to the existing top-K-paths finding algorithms since they would fail when the number of the top K paths is exponential.

The algorithms to solve the second problem and its derivatives are inspired by the recent usage of a Zero-suppressed Binary Decision Diagrams (ZBDD) tool in path delay fault (PDF) coverage calculation and the availability of a Valued-Sum-of-Products (VSOP) tool which is an extension to the ZBDD tool. The algorithms are all non-enumerative algorithms. The algorithms may encounter memory overflow during their computations. In this case, the algorithms would be run on partitioned graphs to avoid memory overflow that causes the memory swapping, which in turn increase the run times.

These algorithms are applied to the timing analysis and verification of (digital) VLSI circuits. More specifically, these algorithms are used to find the top K most critical-delay paths in circuits when the delays in circuits are modeled either deterministic or stochastic. The most critical path in a circuit specifies the (static) timing performance of the circuit, i.e., the clock speed. The method of finding the most critical path in a deterministic-delay (stochastic-delay) model of a circuit is called (statistical) static timing analysis. Furthermore, manufacturing process or deep submicron technology limitations can cause a manufactured circuit to deviate from its specified timing performance. To detect such deviations, manufactured circuits are tested for timing performance. This is called delay testing of circuits.

One delay testing model, called path delay fault testing, tests all of the paths for propagation time of signal transitions along the paths. The inventive path delay fault testing algorithm is used to perform the delay testing only on the top K most critical-delay paths rather than all paths.

See the short tutorial on VSOP tool and detailed background information about the utilized statistical and probabilistic measures, (statistical) static timing analysis, and path delay fault coverage calculation, infra. Moreover, as discussed infra, the inventive methods calculate the statistical measures of path lengths, i.e., path delays in circuit domains. This patent application also discusses the two inventive VSOP-based applications and related algorithms. Moreover, the algorithm to find the top K most critical paths in circuits is presented. A new path delay fault coverage calculation algorithm is devised to report the fraction of the top K most critical paths tested for delay faults. Performances of the inventive algorithms are evaluated with selected 15CA585, ISCAS89, and ITC99 circuits and the results are given infra.

With respect to Valued-Sum-of-Product (VSOP) Tool based on ZBDDs, a combinatorial item set is a set of elements each of which is a combination out of n items. Zero-suppressed Binary Decision Diagrams (ZBDDs) are special type of Binary Decision Diagrams (BDDs) that are designed for implicit representation and efficient manipulation of combinatorial item sets. The manipulation time is proportional to the size of the underlying ZBDD. Therefore, ZBDDs utilize certain reduction rules to compactly represent a set. The size of a ZBDD is also sensitive to the order of items (i.e., variables) in a ZBDD. Many static and dynamic variable ordering approaches are investigated for that purpose.

Figure 10:
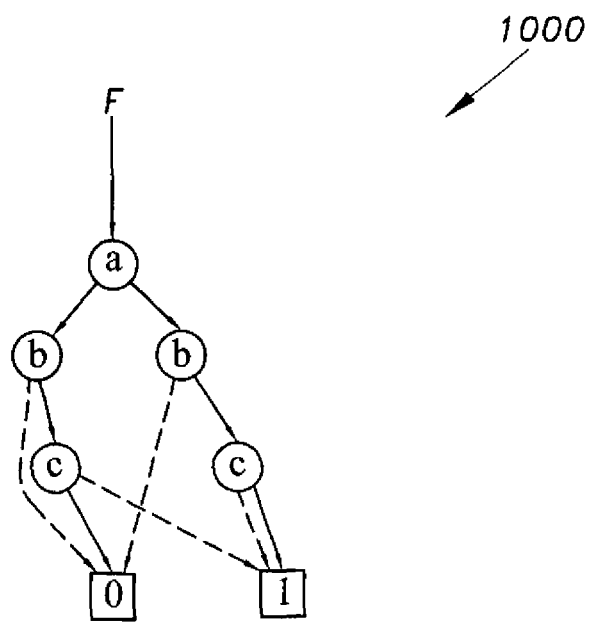
FIG. 10 is a diagram showing an exemplary path of the timing verification method for deterministic and stochastic networks and circuits according to the present invention.

In an exemplary ZBDD Let F={abc, ab, bc} be a combinatorial item set. The set of items in F are {a, b, c}. FIG. 10 illustrates the ZBDD 1000 for F. The items are ordered as a being the first, b being the second, and c being the third. 0-edges are represented by the dashed lines, while 1-edges are represented by the solid lines. Each path from the root to leaf 1 corresponds to a combination in the set. In a path, a solid (dashed) outgoing edge from a node indicates that the respective item is included (excluded) in (from) the combination.

Valued-Sum-of-Product (VSOP) is an extension to ZBDD, and supports assignment of values to the terms in a sum-of-products expression and enables efficient manipulation of expressions. For example, E=2ab+ac−3bd is a VSOP expression where terms ab, ac, and bd have 2, 1, and −3 values, respectively. In VSOP algebra, addition and subtraction follow the ordinary rule (a+a=2a) but the multiplication does not, and a×a=a, not 2a. VSOP adopts the base (−2) binary encoding of numbers and an integer number is decomposed into an n-digit vector of ZBDD $\{F_0, F_1, \ldots, F_{n-1}\}$. $F_i$ is a ZBDD and stores the terms that have a 1 in their $(i+1)^{th}$ digits in their encodings. Specifically, $F_0$ is the set of odd-valued terms, $F_1$ is the set of terms that have a 1 in the second position etc.

Example 2: The VSOP expression F=4abc+5ab+3bc+a is represented in VSOP as in Table 90 shown in FIG. 9. The encoding yields $F_0$={ab, bc, a}, $F_1$={bc}, and $F_2$={abc, ab, bc}.

The following VSOP operations are used in the following sections, and their details are known to skilled artisans:

$E_1$.Permit ($E_2$): Extract terms in $E_1$ each of which is included in one of combinations in $E_2$.

$E_1$.Restrict ($E_2$): Extract terms in $E_1$ each of which includes one of combinations in E2.

$E_1$.TermsQP($E_2$): Filter terms in $E_1$ "OP" to the constant term of $E_2$ where OP={EQ, NE, LE, LI, GT, CE}.

$E_1$ op $E_2$: Two expressions are subject to arithmetic or logical operation op, where OP={+, −, *, 7, %, ==, !=, <, <=, >, >=}.

E.CountTerms ( ): The number of minterms in expression E.

E. Total Val ( ), E.MaxVal ( ), E.MinVal ( ): Sum of the minterm values, maximum value in the set, and minimum value in the set.

Example 3: Let F=4abc+5ab+3bc+a and G=5ab−3bc. Some operations on F and G and their outcomes are tabulated in Table 1100 of FIG. 11. Comparison operations are better understood if we assume 0 coefficients for the nonexisting terms in G i.e., G=0abc+5ab−3bc+0a.

In the present method, we utilize some single and multivariate statistical and probabilistic measures to draw statistical conclusions about the path lengths in a network. These are (1) expected value of the sum of random variables, (2) variance of the sum of random variables, (3) the raw and central moments of a single random variable, and (4) probabilistic inequalities for single random variable case.

1) Expected value and Variance: The expected value of the sum of random variables is equal to the sum of the expected values of random variables (Eq. 1). This equation holds whether the variables are dependent or independent, and they have identical or different probability density functions. The variance of the sum of random variables (Eq. 2) is equal to the sum of the pairwise covariances of random variables where Cov [Xi, X]=Var [Xi] and Cov[$X_i$, $X_j$]=Cov [$X_j$, $X_i$]. Similar to expected value calculation, this equation is also valid when the variables are dependent and have different distributions.

$$E\left[\sum_{i=1}^{N} X_i\right] = \sum_{i=1}^{N} E[X_i] \quad (1)$$

$$V\left[\sum_{i=1}^{N} X_i\right] = \sum_{i=1}^{N} \sum_{j=1}^{N} \text{Cov}[X_i, X_j] \quad (2)$$

$$\sum_{i=1}^{N} V[X_i] + 2 \sum_{i<j}^{N} \text{Cov}[X_i, X_j] \quad (3)$$

2) Moments, Skewness and Kurtosis: The k-th raw moment ($\mu_k'$) and k-th central moment ($\mu_k$) of a probability function are computed according to Eq. 4 and 5, respectively. The second central moment about the mean ($\mu$) is the variance ($\mu_2=\sigma^2$), the positive square root of which is the standard deviation ($\sigma$). For a given population, Eq. (7) computes the k-th raw (k-th central) moments. Moreover, Eq. 8 defines the relationship among the moments. The normalized third central moment is called skewness (Eq. 9) while the normalized fourth central moment minus 3 is called kurtosis (Eq. 10). The value of skewness is positive (negative) when the distribution is skewed to the right (left). The value of kurtosis specifies the peakedness of the distribution. Also, $\mu_4$ of a normal distribution is $3\sigma^4$ so for a normal distribution $\gamma_4=0$.

$$\mu_k' = E[X^k] \quad (4)$$

$$\mu_k = E[(X-\mu)^k] \quad (5)$$

$$\mu_k' = \frac{\sum_{i=1}^{N} X_i^k}{N} \quad (6)$$

$$\mu_k = \frac{\sum_{i=1}^{N} (X_i - \mu)^k}{N} \quad (7)$$

$$\mu_k = \frac{\sum_{i=0}^{k} (-1)^i}{N} \cdot \binom{k}{i} \cdot \mu_{k-i}' \cdot \mu^i \quad (8)$$

$$\gamma_1 = \frac{\mu_3}{\sigma^3} \quad (9)$$

$$\gamma_2 = \frac{\mu_4}{\sigma^4} - 3 \quad (10)$$

3) Probabilistic Inequalities: We use three probabilistic inequalities in this article. These are $k^{th}$ moment bound, Chebyshev's Inequality (Eq. 12), and Cantelli's Inequality (Eq. 13). These theorems do not make any assumption about the underlying probability distributions. The k-th moment bound states that a random variable (X) will take on a value greater than or equal to a real number δ (δ>0) is at most $$\frac{E[|X|^k]}{\delta^k}.$$

Chebyshev's theorem finds the probability that a random variable (X) will take on a value within k standard deviations of the mean (i.e., μ−kσ≤X≤μ+kσ) is at least $$1-\frac{1}{k^2},$$

where k is a positive real number. Similarly, Cantelli's theorem (a.k.a. one-sided Chebyshev's inequality) finds the probability that a random variable (X) will take on a value greater than or equal to k standard deviations of the mean (X≥μ+kσ) is at most $$\frac{1}{1+k^2}, k>0.$$

$$Pr(|X| \geq \delta) \leq \frac{E[|X|^k]}{\delta^k} \quad (11)$$

$$Pr(|X - \mu| \geq k\delta) \leq \frac{1}{k^2} \quad (12)$$

$$Pr(X - \mu \geq k\delta) \leq \frac{1}{1+k^2} \quad (13)$$

4) Omnibus Test for Normality: An omnibus test is a term that refers to a test that considers both the skewness and kurtosis. They are useful as they assess two types of possible non-normality concurrently; if either the skewness or kurtosis (or both) is too extreme then the test will reject the hypothesis that the data comes from a normal distribution. The D'Agostino's $K^2$ test, the Jarque-Bera test, and the Shapiro-Wilk test are examples of omnibus tests. The Jarque-Bera test is simple compared with the other two, and has a Chi-Squared distribution with 2 degrees of freedom. Therefore, we give its formula below for a sample of size N.

$$JB = \frac{N}{6}\left(\gamma_1^2 + \frac{\gamma_2^2}{4}\right) \quad (14)$$

Regarding Critical Paths Problem in Networks, Activity Networks and PERT, examples of large and complex projects, are better managed when the activities and milestones in them are clearly defined. The activities, their durations and milestones, as well as the dependencies among the activities are captured in a network form. In original modeling, the activities were modeled with arcs while milestones were modeled with nodes, therefore, this model is called the activity-on-arc network, Later, some people preferred to model activities with nodes and milestones with arcs, called the activity-on-node network. The critical paths of such networks indicate the total calendar time required to complete the project.

The durations of activities in a network can be fixed time estimates or varying time estimates modeled with random variables. The Critical Path Method (CPM) is a deterministic method that uses a fixed time estimate for each activity. While CPM is easy to use, it does not consider the time variations that can have a great impact on the completion time of a large and complex project with huge number of activities. On the other hand, the Program Evaluation and Review Technique (PERT) allows for randomness in activity completion times and has the potential to reduce both the time and cost required to complete a project.

In stochastic PERT networks, the project completion time is a random variable and project managers are interested in the probability density function (pdf) of the completion time to manage the project better. Computing the pdf of the project completion time is NP-hard problem. Skilled artisans give a classification of approaches to solve this problem, The approaches include (i) exact analysis, (ii) Monte Carlo simulations, (iii) approximation approaches, and (iv) analytical bounding of completion time pdf.

Figure 12:
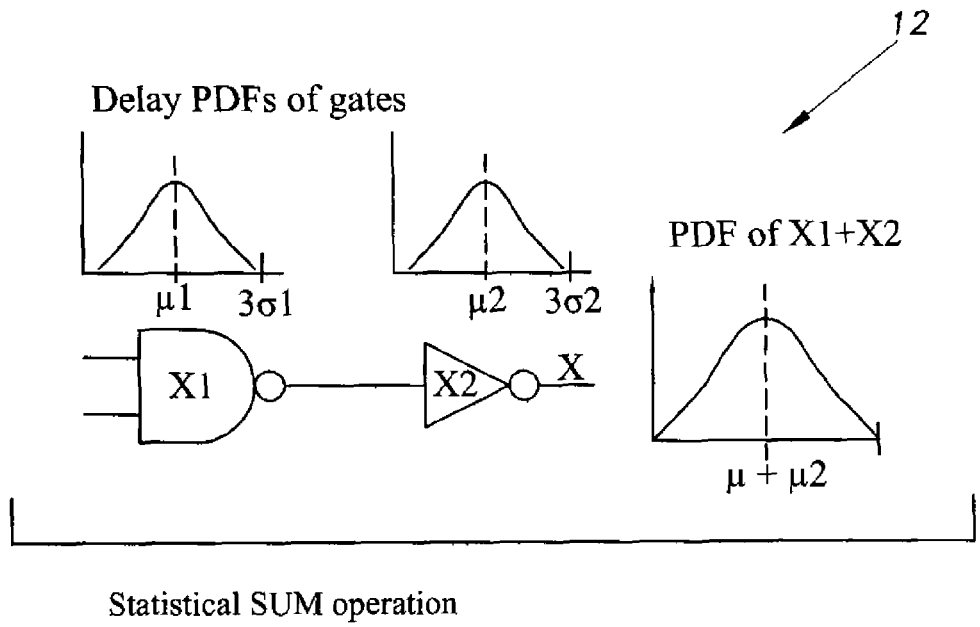
FIG. 12 is a graph showing a statistical SUM operation of the timing verification method for deterministic and stochastic networks and circuits according to the present invention.

2) (Statistical) Static Timing Analysis of Circuits: Static timing analysis method finds the timing performance of a circuit by performing a static analysis on the circuit while dynamic timing analysis method measures the performance of a circuit with respect to a set of simulated input stimuli. In deterministic modeling of circuit, the delays of design components are fixed and the timing performance of a circuit is simply the longest path delay after the false-paths are eliminated. However, process variations cause delay specifications of design components to be modeled with random variables. This modeling results in stochastic network modeling of circuits and finding the probability density function of the timing performance of the underlying circuit is called Statistical Static Timing Analysis (SSTA). FIG. 12 depicts statistical sum operation 12 modeling of gates with random variables and the delay of path as the sum of these two random variables.

Figure 13:
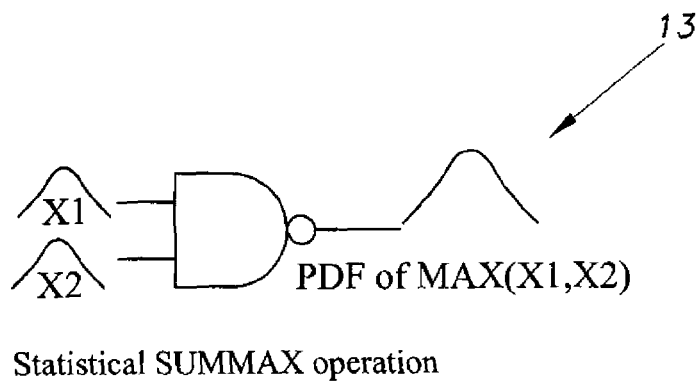
FIG. 13 is a waveform diagram showing a statistical SUM-MAX operation of the timing verification method for deterministic and stochastic networks and circuits according to the present invention.

Two probabilistic analysis methods are proposed for SSTA: (1) path-based approaches and (2) block-based approaches. In path-based SSTA algorithms, a set of potentially critical paths is identified, and a statistical static timing analysis is performed on these paths to approximate the probability density function of path delays. First, the delay distribution of each path is found by statistically summing the delays of all its nodes and edges as illustrated in FIG. 12. The delay distribution of timing performance is found by performing a statistical maximum operation over all the path delays, i.e., MAX $(D_1, D_2, \ldots D_N)$ where D is the random variable for the delay distribution of the $i_{th}$ path. Circuit 13 of FIG. 13 depicts the MAX operation applied to the probability density functions of a gate's inputs.

In block-based SSTA algorithms, both fall and rise times are propagated to each gate and statistical MAX operation is invoked at each gate in the circuit. Calculation of MAX of correlated signals at each gate is considered the hard part of this approach. On the other hand, this approach's run time is linear with circuit size while the run-time of the path-based approach is proportional to the number of paths, which is exponential with respect to the circuit size in most cases.

The present method's SSTA algorithms, presented in the following sections, fall in the category of path-based approaches and find the actual paths along with their expected delays and delay variances. Moreover, correlation among the signals is taken into consideration.

Figure 14:
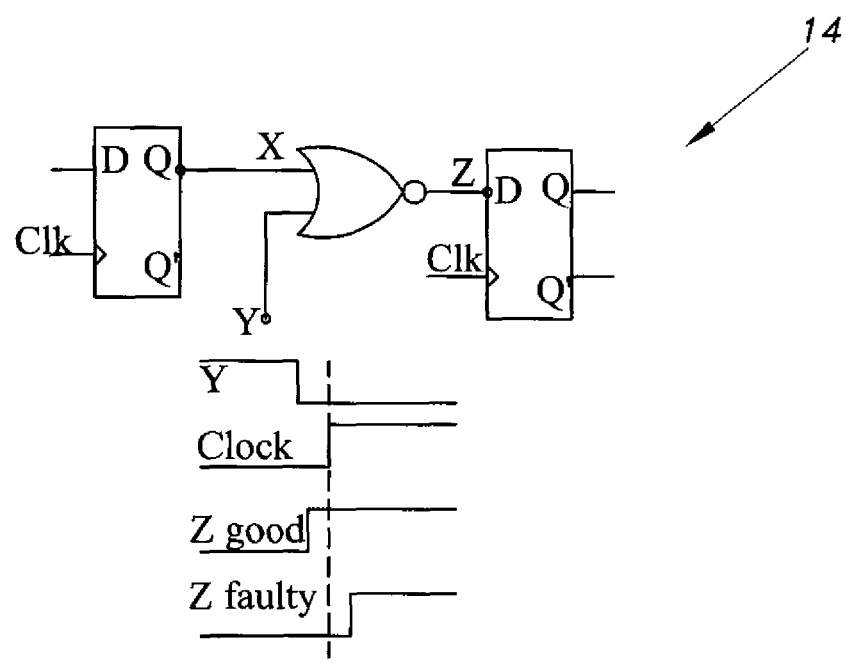
FIG. 14 is a schematic diagram showing an exemplary delay fault in the timing verification method for deterministic and stochastic networks and circuits according to the present invention.

3) Path Delay Fault Coverage Calculation of Circuits: Manufactured circuits may include defects that violate the timing requirements of the circuits, i.e. the specified clock period. Artisans having ordinary skill are aware of several delay defect fault models to automate their detections and diagnoses. Path delay fault model is one of them. In this model, two delay fault models are associated with every path in a circuit: (1) slow-to-fall and (2) slow-to-rise. To detect a slow-to-fall (slow-to-rise) path delay fault, a falling (rising) signal is propagated through the corresponding path and the propagation time is measured. If the signal arrives later than the expected time, then there is a delay defect affecting this particular path. Circuit and timing diagram 14 of FIG. 14 illustrates propagation of a falling signal on path y z. If there is a defect affecting this path, then the signal z would arrive after the clock transition. As a result, the incorrect value would be stored in the flip-flop (FF). The goal of delay testing is to reveal such delay defects.

The general procedure in delay fault testing includes fault modeling, test vector generation, coverage calculation, test vector set compaction, and test vector application to the manufactured circuits. Under path delay fault model, the number of faults in a circuit is equal to twice the number of paths in a circuit. There are circuits with exponential number of paths, e.g., $c6288 \approx 10^{20}$ and $b18 \approx 10^{21}$ paths. Therefore, algorithms are developed to find the test vectors, and coverages without path enumeration. Also, it has been proven that finding coverage is an NP-hard problem.

Figure 15:
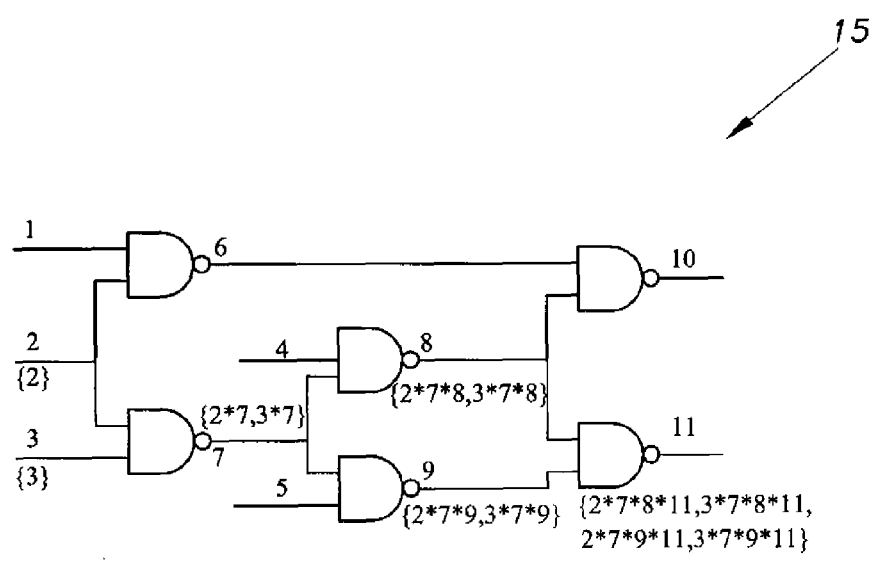
FIG. 15 is a schematic diagram showing a ZBDD-based coverage calculation of a timing verification method for deterministic and stochastic networks and circuits according to the present invention.

The state-of-the-art coverage calculation algorithm utilizes ZBDDs to efficiently and non-enumeratively grade the test set and report the coverage value, i.e., the fraction of the detected paths (Eq. 15). The basic ZBDD based approach simulates a vector pair to propagate signals along some paths in a circuit, and then uses ZBDD-operations to build the set of paths detected by a test vector inductively as illustrated in circuit 15 of FIG. 15, which is c17 circuit 16 in FIG. 16. The approach is repeated for every vector. The union of all sets yields the set of all detected paths and its size is the coverage value. When the basic approach causes memory overflow, the partition-based approach is used to calculate the coverage. The state-of-the-art partition-based algorithm is called PeCoCa by skilled artisans.

$$\text{Coverage} = \frac{DetectedPaths}{TotalPaths} \quad (15)$$

The state-of-the-art coverage calculation algorithms do not take into account the actual delays of the paths. A high coverage value may not indicate the coverage of potentially critical paths. Therefore, a better coverage metric (Eq. 16) would be the fraction of detected potentially-critical paths. In Eq. 16, Total paths$_{\geq l}$(Detected paths$_{\geq l}$) is the number of total (detected) paths whose delays are at least l. In the following sections, we devise algorithms to calculate the coverage of the potentially critical paths.

$$\text{Coverage}_{\geq l} = \frac{\text{Detected paths}_{\geq l}}{\text{Totalpaths}_{\geq l}} \quad (16)$$

Path counting methods utilize the concept of the frequency of a node or a node sequence. Therefore, first, it is defined, and next given some algorithms to calculate the frequencies. The frequency of a node is defined as the number of paths in which this node occurs. Similarly, the frequency of a node sequence is the number of paths in which this node sequence occurs together.

Figure 17A:
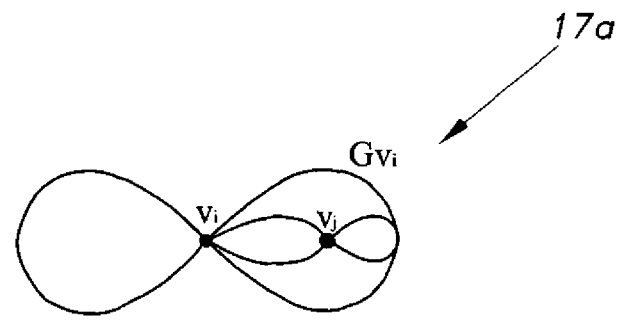
FIG. 17A is a diagram showing a frequency of node pairs of the timing verification method for deterministic and stochastic networks and circuits according to the present invention.
Figure 17B:
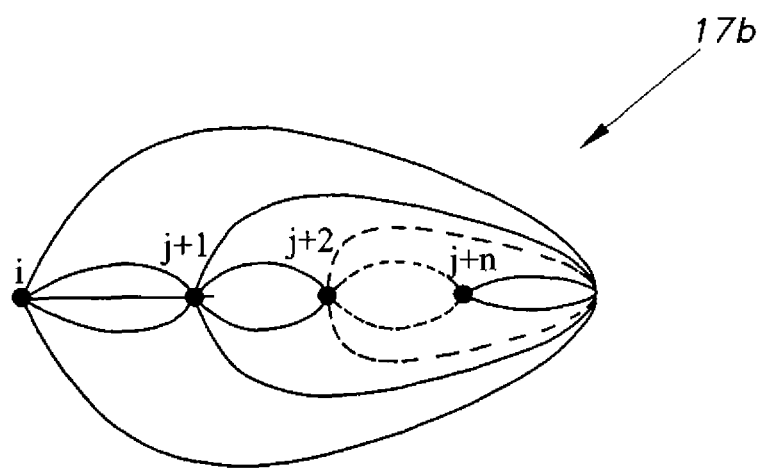
FIG. 17B is a diagram showing a frequency of node tuples of the timing verification method for deterministic and stochastic networks and circuits according to the present invention.

The frequency of node $v_i(f_i)$ is equal to the number of incoming paths ($\vec{f}_i$) times the number of outgoing paths ($\overleftarrow{f}_i$) (Eq. 17). $\vec{f}_i/\overleftarrow{f}_i$ is computed with the forward/backward path counting algorithm. Moreover, the number of paths between two nodes, e.g., $v_i$ and $v_j$ is also computed as follows. Assuming that $v_i$ comes topologically before $v_j$ in the graph, we identify the output cone of $v_i$ (all of the nodes which depend on $v_i$), and run the forward path counting on this subgraph whose only source vertex is $v_i$. This computation gives us the numbers of paths between $v_i$ and all of its dependent nodes such as $v_j(\tilde{f}_{i,j})$ in this subgraph. FIG. 17A illustrates this subgraph concept for node pairs 17a while FIG. 17B depicts the same for a node sequence 17b ($v_i \cdot v_{i+1} \ldots v_{i+n}$).

The number of paths in which $v_i$ and $v_j$ ($f_{i,j}$) occur together is given by Eq. 18. Eq. 19 computes the frequency figure for a sequence of nodes.

$$f_i = \vec{f}_i \cdot \overleftarrow{f}_i \quad (17)$$

$$f_{i,j} = \vec{f}_i \tilde{f}_{ij} \overleftarrow{f}_j \quad (18)$$

$$f_{i_1, i_2, i_3, \ldots, i_n} = \vec{f}_{i_1} \cdot \left( \prod_{j=1}^{n-1} \tilde{f}_{i_j, i_{j+1}} \right) \cdot \overleftarrow{f}_{i_n} \quad (19)$$

Figure 16:
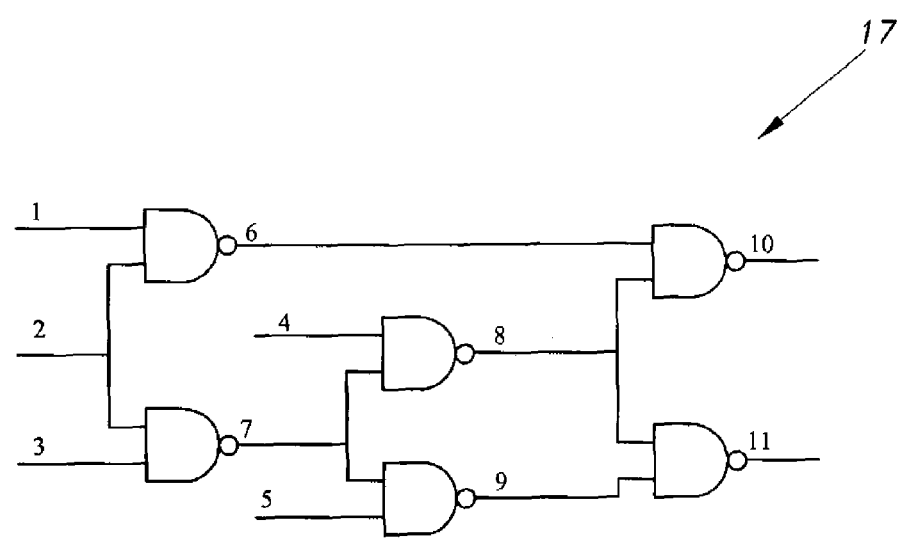
FIG. 16 is a schematic diagram of a test circuit for a timing verification method for deterministic and stochastic networks and circuits according to the present invention.
Figure 27A:
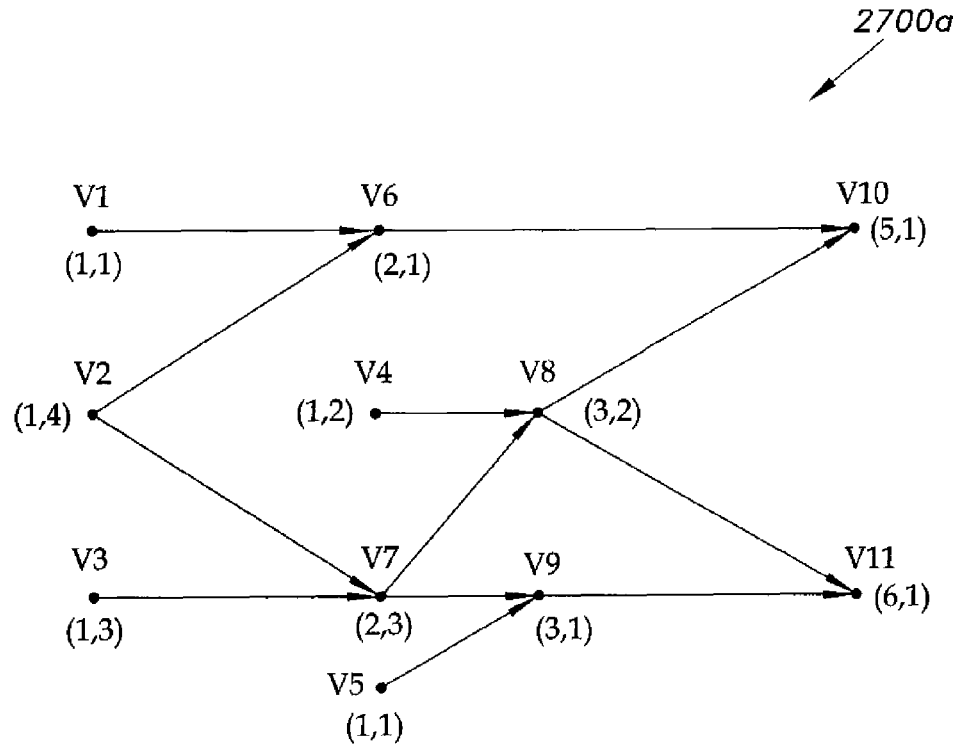
FIG. 27A is a diagram showing the forward and backward path count values at every node in a timing verification method for deterministic and stochastic networks and circuits according to the present invention.
Figure 27B:
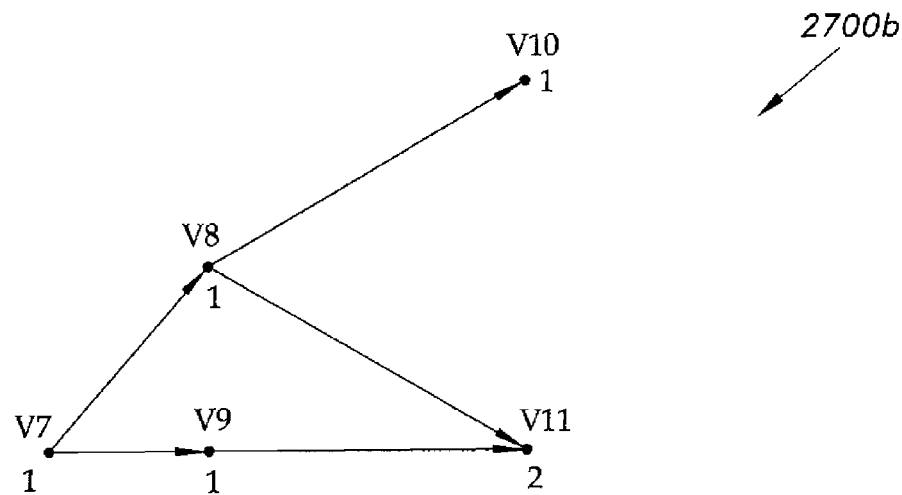
FIG. 27B is a diagrams depicting the subgraph rooted at $v_8$ along with local forward path count values in a timing verification method for deterministic and stochastic networks and circuits according to the present invention.

Example 4: illustrates the frequency calculation with the running example graph (c17 in circuit 16 of FIG. 16). DAG Graph 2700a of FIG. 27A shows the forward and backward path count values at every node e.g., $\vec{f}_8, \overleftarrow{f}_8 = (3, 2)$. The total number of paths in this DAG is 5+6=11, and $v_1 \cdot v_6 \cdot v_{10}$ is one of the paths. Graph 2700b of FIG. 27B depicts the subgraph rooted at $v_8$ along with local forward path count values. From graph 2700b, $\tilde{f}_{7,8} = \tilde{f}_{7,9} = \tilde{f}_{7,10} = 1$ and $\tilde{f}_{7,11} = 2$. Thus, $f_{7,8} = \vec{f}_7 \cdot \tilde{f}_{7,8} \cdot \overleftarrow{f}_8 = 2 \cdot 1 \cdot 2 = 4$. There are a total of 4 paths in which $v_7$ and $v_8$ both occur. These paths are $v_2 \cdot v_7 \cdot v_8 \cdot v_{10}$, $v_2 \cdot v_7 \cdot v_8 \cdot v_{11}$, $v_3 \cdot v_7 \cdot v_8 \cdot v_{10}$, and $v_3 \cdot v_7 \cdot v_8 \cdot v_{11}$.

Statistical measures of path delays are utilized by the present method that include an algorithm to non-enumeratively compute several statistical parameters of path lengths (i.e., path delays) in a circuit. These parameters help us to draw statistical conclusion about path delays, e.g., the approximate number of paths of certain delays. both deterministic and stochastic delay cost cases are considered.

Regarding measurement of deterministic path delays the assumption is that deterministic delay values are assigned to the gates and wires in a gate-level circuit. Thus, path delays are deterministic. For this case, we compute sum of the $k^{th}$ powers of path delays, $$\sum_{i=1}^{PC} l_i^k$$

where PC is the number of paths, $l_i$ is the delay of the $i^{th}$ path in the circuit, and k is a non-negative integer. From this sum, calculate mean ($\mu$), standard deviation ($\sigma$ or $\sqrt{\mu_2}$), variance ($\sigma^2$ or $\mu_2$), skewness ($\gamma_1$), and kurtosis ($\gamma_2$) of path delays. In general, the algorithm calculates the $n^{th}$ raw moment ($\mu_n'$) and $n^{th}$ standardized moment $$\left(\frac{\mu_n}{\sigma^n}\right)$$

of the path delays. The formulae for the mean path delay ($\mu$) the $n^{th}$ central moment ($\mu_n$) and the numerator of $\mu_n$, are given in Eq. 20, Eq. 21, and Eq. 22, respectively.

$$\mu = \frac{\sum_{i=1}^{PC} \ell_i}{PC} \quad (20)$$

$$\mu_n = \frac{\sum_{i=1}^{PC} (\ell_i - \mu)^n}{PC} \quad (21)$$

$$\sum_{i=1}^{PC} (\ell_i - \mu)^n = \sum_{k=0}^{n} \binom{n}{k} \cdot (-\mu)^{n-k} \cdot \left(\sum_{i=1}^{PC} \ell_i^k\right) \quad (22)$$

The heart of the problem is the computation of the sum of the $k^{th}$ powers of paths' lengths. This sum is reformulated and solved with dynamic programming method that utilizes Eq. 8. The following notations are used in our formulation:

1) $PC_v$: the number of partial paths up to vertex v,
2) $I(v)$: the set of v's input vertices,
3) $c_{w,v}$: the cost of edge between vertices w and v,
4) $c_v$: the cost of vertex v (default $c_v=1$),
5) $l_{v(i)}^k$: the $k^{th}$ power of the $i^{th}$ partial path's length at v, where $1_{v(i)}^k$ is $c_v^k$ at the source vertices, and
6) $S_{v(k)}$: sum of the $k^{th}$ powers of partial paths' lengths at vertex v.

A recursive formulation is given for $S_{v(k)}$ in Eqns. 23-25. At a source vertex v, $PC_v=1$ and $1_{v(i)}^k = c_v^k$, where the default $c_v=1$. Eq. 25 indicates that we need $S_{v(i)}$ values for i=0, ..., k at every vertex v. These values can be recomputed on demand or computed once and stored for future use. Since k values would be usually small, we choose to store and reuse these values, Furthermore, $S_{v(k)}$ can be calculated more efficiently by looking-up combination values from a precomputed Pascal triangle of k rows and incrementally computing powers of edge/vertex costs. Thus, the algorithm is invoked with k to compute $S_{v(0)}, \ldots, S_{v(k)}$ values at v that requires $O(k^2 \cdot (V+E))$ overall run time. Moreover, vertex costs can also be incorporated into the equations by simply substituting $c_{w,v}$ with the sum of associated edge and vertex costs, i.e., $c_{w,v}+c_v$. However, Eq. 23, 24 and 25 can be further simplified if only vertex costs are considered. For this case, the simplified formulation is given in Eq. 26.

$$S_{v(k)} = \left(\sum_{i=1}^{PC} \ell_i^k\right) \quad (23)$$

$$= \sum_{w \in I(v)} \sum_{i=1}^{PC_w} (\ell_{w(i)} + c_{w,v})^k \quad (24)$$

$$= \sum_{j=0}^{k} \binom{k}{j} \cdot c_{w,v}^{k-j} \cdot S_{w(j)} \quad (25)$$

$$S_{v(k)} = \sum_{j=0}^{k} \left(\binom{k}{j} \cdot c_v^{k-j} \cdot \sum_{w \in I(v)} S_{w(j)}\right) \quad (26)$$

Path counting algorithms can be used to find the total path count (PC) in a DAG in O(V+E) time. The forward path counting algorithm assigns 1 to all source vertices, and sums the path count values at the input vertices of a vertex to get the path count value at this vertex. The total number of paths in a DAG is equal to the sum of the path counts at the sink vertices. Thus, like $S_{v(k)}$ values, PC is also computed non-enumeratively. It can be verified that $S_{v(0)}$ value at a vertex is equal to the value generated by the forward path counting algorithm at the same vertex. Therefore, the number of paths can be found by simply summing $S_{v(0)}$ values at the sink vertices. As a result, we are able to calculate both numerator and denominator of $\mu_n$ without path enumeration. We illustrate $\mu_n$'s computation with an example.

Figure 18:
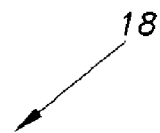
FIG. 18 is table showing the sum of powers of path lengths in a timing verification method for deterministic and stochastic networks and circuits according to the present invention.
Figure 28:
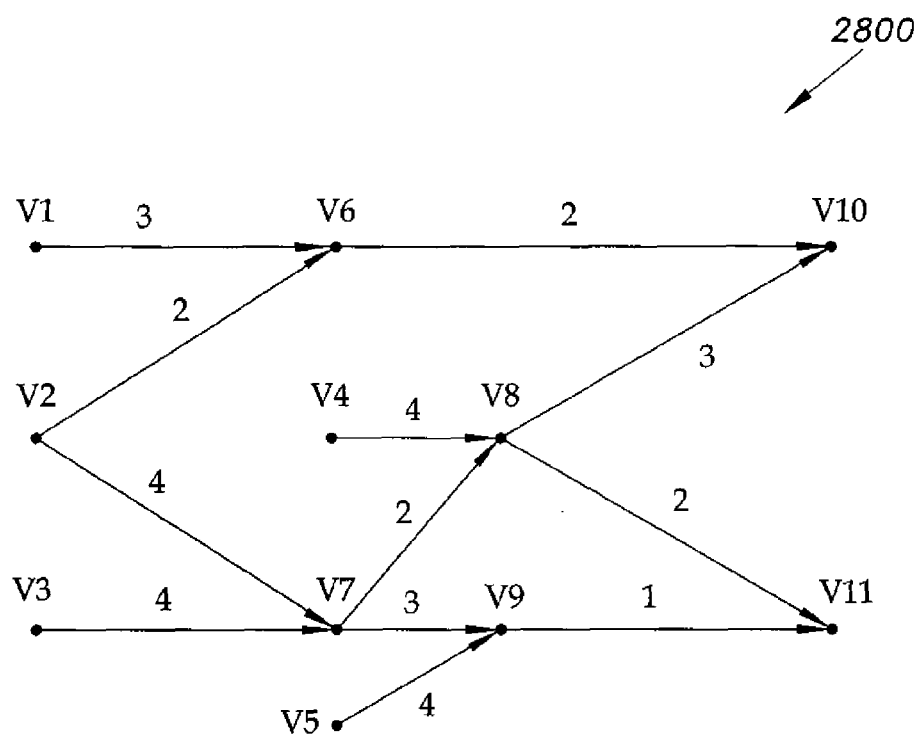
FIG. 28 is a graph showing exemplary deterministic edge costs in a timing verification method for deterministic and stochastic networks and circuits according to the present invention.

Example 5: FIG. 28 is the same example graph showing deterministic edge costs 2800. In this graph, the average path length ($\mu$), variance of path lengths ($\sigma^2$ or $\mu_2$), $\mu_3$ and $\mu_4$ are 7, 2.73, −2.18, and 13.64, respectively. We apply Eq. 23-25 to compute $S_{v_j(k)}$ values and fill them in Table 18 of FIG. 18: rows are for k values and columns are for vertices. Column $v_s$ is for all source vertices. From these $S_{v_j(k)}$ values, the path count, mean, and central moments are computed. Central moments would be calculated according to Eq. 21 and 22. We calculate PC, $\mu$. and $\mu_2$ from the table as follows.

$$PC = S_{v10(0)} + S_{v11(0)} = 11$$

$$\mu = \frac{S_{v10(1)} + S_{v11(1)}}{S_{v10(0)} + S_{v11(0)}} = \frac{34+43}{5+6} = 7$$

$$\sum (\ell_i - 7)^2 = \binom{2}{0}(-7)^2(S_{v10(0)} + S_{v11(0)}) + \binom{2}{1}(-7)^1(S_{v10(1)} + S_{v11(1)}) +$$

$$\binom{2}{2}(-7)^0(S_{v10(2)} + S_{v11(2)}) \Rightarrow 49 \cdot 11 - 14 \cdot 77 + 569 \Rightarrow 30$$

$$\mu_2 = \frac{30}{11} = 2.73$$

With respect to Measuring Stochastic Path Delays, the proposed deterministic approach in the previous section can be generalized to measure path delays in stochastic networks where gate and wire delays are specified with mean and variance pairs. From the expected values of gates and wires the followings can be computed directly with the aforementioned method for deterministic case by setting costs of edges/vertices to their mean values:

1) the mean expected path delay value ($\mu_E$),
2) the variance of expected path delay values ($\sigma_E$), and
3) the moments of expected path delay values.

Calculation of variance-related parameters requires additional care since covariances among the gates/wires create data dependency among path delays. We compute the mean variance (Eq. 27) from the path delay variances. The mean variance formula (Eq. 27) is re-formulated as in Eq. 28. In Eq. 28, $f_i$ is the number of paths in which random variable X, appears while $f_{i,j}$ is the number of paths in which random variable pairs ($X_i$ and $X_j$) occur together. Also, $\tau_{X_i,X_j}^2$ is the covariance of random variables $X_i$ and $X_j$.

$$\bar{\sigma}^2 = \frac{\sum_{i=1}^{PC} \sigma_i^2}{PC} \quad (27)$$

$$\sum_{k=1}^{PC} \sigma_k^2 = \sum_{i=1}^{|V|} f_i \cdot \sigma_{X_i}^2 + \sum_{i=1}^{|V|} \sum_{j=i+1}^{|V|} 2 \cdot f_{i,j} \cdot \sigma_{X_i,X_j}^2 \quad (28)$$

The probabilistic inequalities can be utilized to find the approximate number of paths within certain interval under stochastic delay model. This is done as follows. Let μ be the mean path delay of maximum path delays, Since $\mu \geq \mu_E$, $\mu_E + k\sigma_E \leq \mu + k\sigma_E$. We convert this inequality to an equality: $\mu_E + l\sigma_E = \mu + k\sigma_E \Rightarrow l \geq 1$. From Eq. 13, $$Pr(X \geq \mu + l\sigma_E) \leq \frac{1}{1+l^2} \leq \frac{1}{1+k^2}.$$

Therefore, $Pr(X \geq \mu_E + k\sigma_E)$ is also an upper bound for $Pr(X \geq \mu + l\sigma_E)$.

A first application, the top K most critical paths includes the algorithms that store all or select paths along with their parameters delays. The top K most critical paths are selected from this path database. Both deterministic delay and stochastic delay modeled circuits are considered.

To find the top K-most critical path, we utilize a data-driven binary search (DDBS) algorithm (Algorithm 1), shown as pseudo code 10 in FIG. 1. Since sorting and index-based accessing to the paths is not possible, the DDBS algorithm uses non-enumerative VSOP operators to find the set of top K paths from the built path database. Also, in this algorithm, when $$\left\lfloor \frac{max + min}{min} \right\rfloor = min,$$

the search to find the set is repeated for min+1 in the last step. Otherwise, the algorithm would not terminate.

Algorithm 2 shown as pseudo code 20 in FIG. 2 starts from the source vertices and inductively builds the path database in the topological order of gates. At each node, the algorithm builds the set of partial paths that end this node. The sum of sink nodes' paths is the set of all paths along with their delays.

In algorithm 2, L and $L_i$ s are VSOP expressions, and $L_i = L_i$ removes the values of terms in a VSOP expression. For example, $((2ab+3bc)=(2ab+3bc)) \Rightarrow ab+bc$. The last loop takes the union of all paths that end at the sinks. After that path queries can be performed on all paths using VSOP operations. In this inventive algorithm, we query the top K most critical paths. Inductive building of a set of paths is illustrated with the example below.

Example 6; In FIG. 28, $L_2 = c_2 \cdot v_2$, $L_3 = c_3 \cdot v_3$ where $c_i$ is the cost associated with node $v_i$. Thus, the partial paths at $v_7$ along with their delays, assuming the delays associated with nodes only, are computed as follows:

$L_7 = L_2 + L_3$ $\Rightarrow (c_2 \cdot v_2 + c_3 \cdot v_3 + (v_2 + v_3) \cdot c_7 \cdot v_7$ $\Rightarrow (c_2 + c_7) \cdot v_2 \cdot v_7 + (c_3 + c_7) \cdot v_3 \cdot v_7.$ The second algorithm 20 can be generalized to calculate the paths along with the $k^{th}$ powers of path delays. In another words, the coefficient of a path is the $k^{th}$ power of its delay.

Equation 29 finds the set of paths along with the $k^{th}$ power of their corresponding delays at vertex v. This approach maintains the paths and that is the key difference between $2^{nd}$ algorithm 20 and first algorithm 10. The statistical values in first algorithm 10 can be computed with the non-enumerative VSOP operations. For example, from Eq. 29, we compute the sum of the $k^{th}$ power of the path delays (Eq. 30) and the mean path length (Eq. 31).

$$L_{v(k)} = \left( \sum_{\omega \in I(v)} \sum_{j=0}^{k} \binom{k}{j} \cdot L_{w(j)} \cdot c_{w,v}^{k-j} \right) \cdot v \quad (29)$$

$$S_{v(k)} = L_{v(k)} \cdot TotalVal(\ ) \quad (30)$$

$$\mu = \frac{\sum_{v \in Sink} L_{v(1)} \cdot TotalVal(\ )}{\sum_{v \in Sink} L_{v(1)} \cdot CountTerms(\ )} \quad (31)$$

Figure 19:
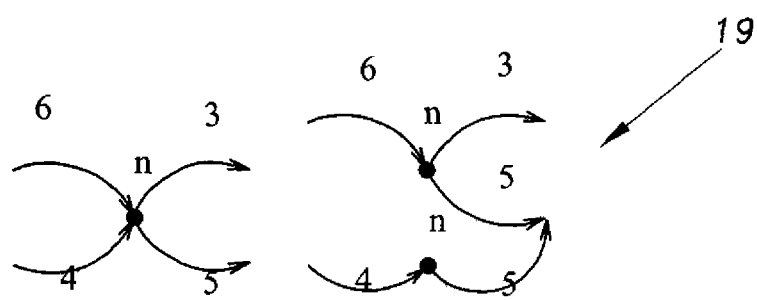
FIG. 19 is diagram showing overlapping subpaths in a timing verification method for deterministic and stochastic networks and circuits according to the present invention.

When the basic delay calculation causes memory overflow, the inventive method uses a partition-level delay calculation algorithm (third algorithm 30 of FIG. 3). This algorithm 30 joins all the partial paths on a complete cut node sequence and updates the set of top K paths. It must work on complete cut node sequences since the delays of the complete paths cannot be determined from the partial paths without fully joining them. Exemplary graph 19 (left side) in FIG. 19, shows n, as a cut vertex, and there are four subpaths illustrating overlapping subpaths due to the length constraint. If we want to filter the paths whose delays are at least 8, then only three of the four paths would be included in the answer as shown in FIG. 19 (right side). These three paths cannot be identified without fully joining the partial paths that form them.

Regarding stochastic path delays, we introduce fourth algorithm 40, shown in FIG. 4, to find the top K most critical paths in stochastic networks when the delays of the components in a circuit are given in terms of statistical parameters such as mean delays of design elements. The algorithm 40 takes into consideration the correlation among the paths. It receives expected component delays as well as covariances between the components in a circuit as input and computes two sets of path delay database: (1) the paths along with their expected delays, and (2) the paths along with their delay variances. From the variances, we approximate the standard deviations since floating point operations are not available in the VSOP tool. After that, the standard deviations and expected mean delays of paths are combined into one delay and the top K critical path delay finding algorithm is called on the combined path delays.

Fifth algorithm 50 shown in FIG. 5 calculates the approximate standard deviations (rounded to integer) from the path delay variances. At each step of the loop, algorithm 50 sets the standard deviations of the paths to i whose variances are greater than or equal to $i^2$ but less than $(i+1)^2$. The performance of the algorithm depends on how the path delay variances are clustered. If they are clustered around some numbers, then each step of the loop computes the standard deviations of many paths thus algorithm 50 yields to a good performance. Like in the deterministic path delay calculation, the basic stochastic path delay calculation algorithm can cause memory overflow. In this case, we use the partition-level stochastic delay calculation algorithm (algorithm 60 shown in FIG. 6). This algorithm 60 operates like the basic stochastic delay computing algorithm. It computes the expected path delay values ($E_\tau$), the path delay variances ($V_\tau$), and combined path delays ($L_\tau$) for every subgraph identified with a complete cut node sequence $\tau$. The top K critical paths are maintained in a set (L), assuming that the top K paths are not huge. Otherwise, we should process every sequence's critical paths without maintaining them in one set.

A second application, delay-sensitive path delay implements a fault coverage calculation in which the VSOP tool is used in place of ZBDD. These new algorithms calculate the coverage metric (Eq. 16) non-enumeratively. Specifically, two algorithms are presented: (1), as shown in FIG. 7, a basic coverage calculation algorithm 70 (CoCa$^+$), and (2), as shown in FIG. 8, a partition-based coverage calculation algorithm (PeCoCa$^+$) 80 that overcomes the memory overflow of the basic one.

The basic Coverage Calculation algorithm 70, (1) simulates a test vector, (2) identifies the subgraph (subcircuit) detected/activated by the vector ($G_i$), (3) runs the VSOP based path delay finding algorithms on the subgraph ($C_i$, and (4) maintains the set of detected paths along with their corresponding delays (C). C.Permit($C_i$) finds the intersection of C and $C_i$ and its subtraction avoids multiple addition of the same paths to the set of detected paths. The last statement returns the number of detected paths whose delay is greater than the lower delay bound (UB).

The partition-level coverage calculation (PeCoCa$^+$) 80 addresses issues found in the basic algorithm. The basic algorithm above may cause memory overflow during the coverage calculation of path-intensive circuits such as c6288 of ISCAS85 and b18 of ITC99. Such circuits are partitioned into subcircuits and coverage calculation is performed at the partition-level circuits. The PeCoCa is improved to a VSOP-based PeCoCa$^+$ PeCoCa$^+$ must compute the exact coverage by performing coverage calculations on the complete sequences, and avoid the heuristics in PeCoCa that rely on the joining of the partial paths on shorter sequences. For example, PeCoCa immediately classifies all paths passing via vertex $v_i$ as newly detected if all partial paths ending at $v_i$ are new. However, this or similar heuristics are not trivially possible when the path delays are considered. Therefore, modifications are made accordingly.

The modules of PeCoCa$^+$ are devised in such a way that they work for deterministic as well as stochastic delay model cases. The main routine of PeCoCa$^+$ simulates each vector, calls the cut node sequence generator (Sequences$^+$( )). The sequence generator invokes SequenceCoverage$^+$( ) for each activated complete cut node sequence and sums the values returned by this subroutine. A cut node sequence is activated if the currently simulated vector detects at least one path passing via the nodes in the cut node sequence. The high-level code for SequenceCoverage$^+$( ) is included in algorithm 80. In this algorithm 80, $C_\tau$ is the set of paths along with their respective delays, which are detected by the currently simulated vector $v_i$ and involve only the nodes in cut node sequence $\tau$. $V_\tau$ is the set of previously simulated vectors that detect at least one path passing through the nodes in sequence $\tau$. $P_{v_j,\tau}$ is the set of paths along with their respective delays that are detected by a previous vector $v_j$. The algorithm proceeds with the re-simulation of each related past vector and computation of complete paths along with their delays by calling deterministic or stochastic delay calculating function. The paths detected by the past vector v is subtracted from the set of paths detected by the current vector v. The final size of $C_\tau$ is the number of newly detected paths with respect to the cut node sequence $\tau$ whose delays are greater than or equal to the specified lower delay bound.

To achieve the experimental results we implemented most of the inventive algorithms and assessed their performances using circuit benchmarks. The first set of experiments assessed the performance of the method calculating the statistical properties/measures of circuits. The second set of experiments assessed the performances of the VSOP-based deterministic path delay computing algorithms. The third set of experiments assessed the performances of VSOP-based stochastic path delay computing algorithms. The experiments include the partition-based results as well. We approximated the performance of the path delay fault coverage calculation algorithms (CoCa$^+$ and PeCoCa$^+$) from the experiments instead of implementing them. All experiments were performed on an Intel-86-based 64-bit processor with two dual 2.66-GHz CPUs, and 8-Gbyte RAM with the Linux operating system.

Table 2000 shown in FIG. 20 tabulates the properties of the ISCAS85, ISCAS89 and ITC99 circuits used in our experiments. In this table, ISCAS85, combinational parts of ISCAS89, and ITC99 are given in the format of c999, cs999, and b99, respectively. For example, c880 has 60 inputs (source) and 26 output (sink) nodes, 443 gates, 729 nets (edges), and 8,642 paths.

Figure 21:
FIG. 21 is a table of costs in a timing verification method for deterministic and stochastic networks and circuits according to the present invention.

Regarding statistical measures of path delays, in the deterministic case, we set the delays of gates to 1 uniformly in all circuits, and computed the mean ($\mu$), standard deviation ($\sigma$), skewness ($\gamma_1$), and kurtosis ($\gamma_2$), of path delays along with the longest delay path (Lp.), and in each circuit. In the stochastic case, we set expected gate delays and covariances between the gate delays to 1. The results of deterministic case become the results for the expected path delays. We also report the average of path delay variances ($\mu_{\sigma^2}$), which takes into consideration covariances. Table 21 of FIG. 21 tabulates the results. The run times are reported under the column of Time in seconds. Furthermore, we use skewness ($\gamma_1$), and kurtosis ($\gamma_2$) results to test for the normality of the path delays with JarqueBera test (Eq. 14). For example, JB value for c880 is $$\frac{8642}{6}\left((-0.62)^2 + \frac{(0.53)^2}{4}\right) = 654.81.$$

We look up this value from the Chi Square table and reject the hypothesis that the path delays come from a normal distribution. Note that we used Jarque-Bera test just to illustrate the usage of skewness and kurtosis values in normality testing.

Figure 22:
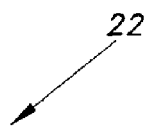
FIG. 22 is table of $10^{th}$ moment costs in a timing verification method for deterministic and stochastic networks and circuits according to the present invention.

Finally, we further assessed the performance of the moment computing algorithm by computing up to the $10^{th}$ moment with a uniform cost of 2 for all gate delays. The run-time results are given in Table 22 of FIG. 22, where Time is in seconds.

The deterministic path delay results presented herein were obtained using gate delays set to a number between 1 and 10 randomly. Both basic and partition-based algorithms were evaluated with selected benchmarks and the results are given in Table 23 of FIG. 23 and Table 24 of FIG. 24, respectively. We report the number of used ZBDD nodes and computing times in seconds. The partition-based results were given for three different partitioning cases. For partition is equal to 1, we compute the path delays for every input-output pair of the circuit, rather than on the whole circuit.

Figure 26:
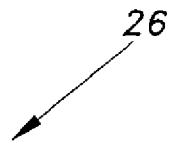
FIG. 26 is a table of partition-based algorithm results in a timing verification method for deterministic and stochastic networks and circuits according to the present invention.

With respect to stochastic path delay results, the stochastic path delay computing algorithms' results are presented. In the experiment, we assumed that the path delays are dependent. Furthermore, the expected gate delays as well as covariances between the gate delays are set to a number between 1 and 10 randomly. Both basic and partition-based algorithms were evaluated with selected benchmarks and the results are given in Table 25 of FIG. 25 and Table 26 of FIG. 26, respectively. We report the number of used ZBDD nodes and computing times in minutes:seconds format.

Regarding approximate performance of path delay fault coverage calculation algorithm, the performance results for computing the delay-sensitive path delay fault coverages are approximated from the results of deterministic and stochastic delay computing performance results. In fact, we derive upper bounds on the performance results as follows. Assuming that each test vector activates all of the paths in a circuit, $CoCa^+$ and $PeCoCa^+$ call the path delay computing algorithm ($PathDelay()$)

$$\frac{N(N+1)}{2}$$

times, where N is the number of delay test vectors. Since the path delay fault simulation algorithm is linear with the circuit size, the performance of Pathdelay() dominates the run-time of the path delay fault coverage calculation algorithms. Therefore, the run-time of $CoCa^+$ or $PeCoCa^+$ is $$\frac{N(N+1)}{2}$$

times the run-time of the invoked Pathdelay() algorithm. The memory requirement can be at most as twice as the memory requirement of Pathdelay() algorithm since at any time we are maintaining one set of paths for the currently simulated vector and another set for one of the previously simulated vectors.

The present invention can process large circuit sizes with thousands of nodes. Moreover, a substantially large number of paths can be stored thereby facilitating work with a large number of critical paths. The inventive path-based approach quantifies statistical measures of path delays utilizing VSOP-based algorithms.

The present invention introduces novel algorithms to compute some statistical measures and the top K most critical paths in the stochastic and deterministic timing models of (combinational) circuits. The statistical measure finding algorithm is linear with the circuit size and does not store paths or partial paths. The algorithms for finding the top K most critical paths store paths. All algorithms are non-enumerative, i.e., they don't exercise the paths one by one to find the desired outcomes.

Skilled artisans should understand that it may be possible to use the algorithm for finding the statistical measures to better approximate the statistical MAX operation. Also, there may be ways to improve the VSOP tool to handle symbolic valued sum of products instead of the currently handling of only nominal valued products.

It will be understood that the diagrams in the Figures depicting the timing verification method for deterministic and stochastic networks and circuits are exemplary only, and may be embodied in a dedicated electronic device having a microprocessor, microcontroller, digital signal processor, application specific integrated circuit, field programmable gate array, any combination of the aforementioned devices, or other device that combines the functionality of the timing verification method for deterministic and stochastic networks and circuits onto a single chip or multiple chips programmed to carry out the method steps described herein, or may be embodied in a general purpose computer having the appropriate peripherals attached thereto and software stored on a non-transitory computer readable media (exemplary media are optical disk, flash drive, hard drive, SD card, and the like) that can be loaded into main memory and executed by a processing unit to carry out the functionality of the steps of the inventive method described herein.

It is to be understood that the present invention is not limited to the embodiments described above, but encompasses any and all embodiments within the scope of the following claims.

I claim:

1. A computer-implemented timing verification method for deterministic and stochastic networks and circuits, comprising the steps of:

forming a directed acyclic graph representing an electronic digital circuit, the graph having a first plurality of vertices connected by a second plurality of edges thereby creating paths which can be traversed along the directed acyclic graph;

computing statistical length measures based on the paths to non-enumeratively determine a top K most critical paths of the electronic digital circuit;

determining a first path delay timing cost for all of the electronic digital circuit based on the statistical measures computation of the top K most critical paths; and displaying a first display record verifying whether the first path delay timing cost is within a margin of a first specified timing performance requirement of the electronic digital circuit.

2. The computer-implemented timing verification method for deterministic and stochastic networks and circuits according to claim 1, further comprising the steps of:

computing statistical length measures of vertices associated with said top K most critical paths;

determining a second path delay timing cost for all of said electronic digital circuit based on said statistical length measures computation of said top K most critical paths associated vertices; and displaying a second display record verifying whether said second path delay timing cost is within a margin of a second specified timing performance requirement of said electronic digital circuit.

3. The computer-implemented timing verification method for deterministic and stochastic networks and circuits according to claim 1, wherein said forming step forms a stochastic directed acyclic graph.

4. The computer-implemented timing verification method for deterministic and stochastic networks and circuits according to claim 3, wherein said computing step further comprises calculations of an expected length and variance of said paths.

5. The computer-implemented timing verification method for deterministic and stochastic networks and circuits according to claim 1, wherein said forming step forms a deterministic directed acyclic graph.

6. The computer-implemented timing verification method for deterministic and stochastic networks and circuits according to claim 5, wherein said computing step further comprises calculations of a $k^{th}$ central moment of said paths.

7. A computer software product, comprising a medium readable by a processor, wherein the medium is a non-transitory computer readable media, the medium having stored thereon a set of instructions for timing verification of deterministic and stochastic networks and circuits, the set of instructions including:
- (a) a first sequence of instructions which, when executed by the processor, causes said processor to form a directed acyclic graph representing an electronic digital circuit, said graph having a first plurality of vertices connected by a second plurality of edges thereby creating paths which can be traversed along said directed acyclic graph;
- (b) a second sequence of instructions which, when executed by the processor, causes said processor to compute statistical length measures based on said paths to non-enumeratively determine a top K most critical paths of said electronic digital circuit;
- (c) a third sequence of instructions which, when executed by the processor, causes said processor to determine a first path delay timing cost for all of said electronic digital circuit based on said statistical measures computation of said top K most critical paths; and
- (d) a fourth sequence of instructions which, when executed by the processor, causes said processor to display a first display record verifying whether said first path delay timing cost is within a margin of a first specified timing performance requirement of said electronic digital circuit.

8. The computer software product according to claim 7, further comprising:

a fifth sequence of instructions which, when executed by the processor, causes said processor to compute statistical length measures of vertices associated with said top K most critical paths;

a sixth sequence of instructions which, when executed by the processor, causes said processor to determine a second path delay timing cost for all of said electronic digital circuit based on said statistical length measures computation of said top K most critical paths associated vertices; and a seventh sequence of instructions which, when executed by the processor, causes said processor to display a second display record verifying whether said second path delay timing cost is within a margin of a second specified timing performance requirement of said electronic digital circuit.

9. The computer software product according to claim 7, further comprising an eighth sequence of instructions which, when executed by the processor, causes said processor to form a stochastic directed acyclic graph.

10. The computer software product according to claim 9, further comprising a ninth sequence of instructions which, when executed by the processor, causes said processor to calculate of an expected length and variance of said paths.

11. The computer software product according to claim 7, further comprising a tenth sequence of instructions which, when executed by the processor, causes said processor to form a deterministic directed acyclic graph.

12. The computer software product according to claim 11, further comprising:

an eleventh sequence of instructions which, when executed by the processor, causes said processor to calculate a $k^{th}$ central moment of said paths.

* * * * *